United States Patent [19]

Sims

[11] Patent Number: 4,919,166

[45] Date of Patent: Apr. 24, 1990

[54] TWO-WAY FLOW VALVE

[76] Inventor: Anthony M. Sims, Hindmarsh Rd, Murray Bridge, South Australia, Australia 5253

[21] Appl. No.: 372,838

[22] Filed: Jun. 27, 1989

[30] Foreign Application Priority Data

Jul. 5, 1988 [AU] Australia ................. PI9160

[51] Int. Cl.$^5$ ............................................. F16K 17/18
[52] U.S. Cl. ..................................... 137/493; 137/509
[58] Field of Search .................. 91/420, 463; 137/493, 137/509

[56] References Cited

U.S. PATENT DOCUMENTS 3,472,261 10/1969 Brannon ................................. 91/420
4,022,113 5/1977 Blatt ....................................... 91/463
4,199,004 4/1980 Wada .................................... 137/493
4,228,818 10/1980 Nelson ............................. 137/493 X Primary Examiner—Robert G. Nilson
Attorney, Agent, or Firm—Baker, Maxham, Jester & Meador

[57] ABSTRACT

A two-way valve comprises a body containing two cylinders, a pair of valve assemblies, each comprising a piston which slides in a respective cylinder, each piston having a spindle extending from one end, a metering valve member which slides on the spindle and normally engages a valve seat at an end of the relevant cylinder, a circlip or other abutment on the spindle which engages the valve member and moves it away from the seat upon movement of the piston in one direction by hydraulic pressure, and a restraining spring inhibiting that movement.

8 Claims, 3 Drawing Sheets

4,919,166

TWO-WAY FLOW VALVE

This invention relates to a valve which is useful for inhibiting flow in one direction while allowing it to take place in another, and vice versa.

BACKGROUND OF THE INVENTION

There are many applications in the hydraulics industry for two-way flow valves, and one particular application wherein the valve of this invention is particularly suitable is in the application of hydraulic gymnasium equipment.

In many applications it is desirable to have variable resistances to movement in fore and aft directions, for example for the development of bicep and tricep muscles of the arms, and consequently it is desired that pressure relief valves be independently adjustable for these purposes. It is essential that valves used for gymnasium equipment do not leak, and the main object of this invention is to provide a valve which is unlikely to leak and which will be readily adjusted to vary the pressure for push/pull operations. Another object is to provide a valve which is very easily constructed and which is simple and inexpensive to produce.

BRIEF SUMMARY OF THE INVENTION

In an embodiment of this invention, a two-way valve comprises a body containing two cylinders, a pair of valve assemblies, each comprising a piston which slides in a respective cylinder, each piston having a spindle extending from one end, a metering valve member which slides on the spindle and normally engages a valve seat at an end of the relevant cylinder, a circlip or other abutment on the spindle which engages the valve member and moves it away from the seat upon movement of the piston in one direction by hydraulic pressure, and a restraining spring inhibiting that movement.

With this invention the metering valve member which is slidable over the spindle can also function as a non-return valve, while the valve assembly can also function as a pressure relief valve. Fluid therefore can either flow into or out of the space between the two pistons, so that reservoir requirement is very small.

BRIEF DESCRIPTION OF THE DRAWINGS

An embodiment of the invention is described hereunder in some detail with reference to and is illustrated in the accompanying sketches, in which.

DETAILED DESCRIPTION OF THE PREFERRED EMBODIMENT

Figures 1, 2:
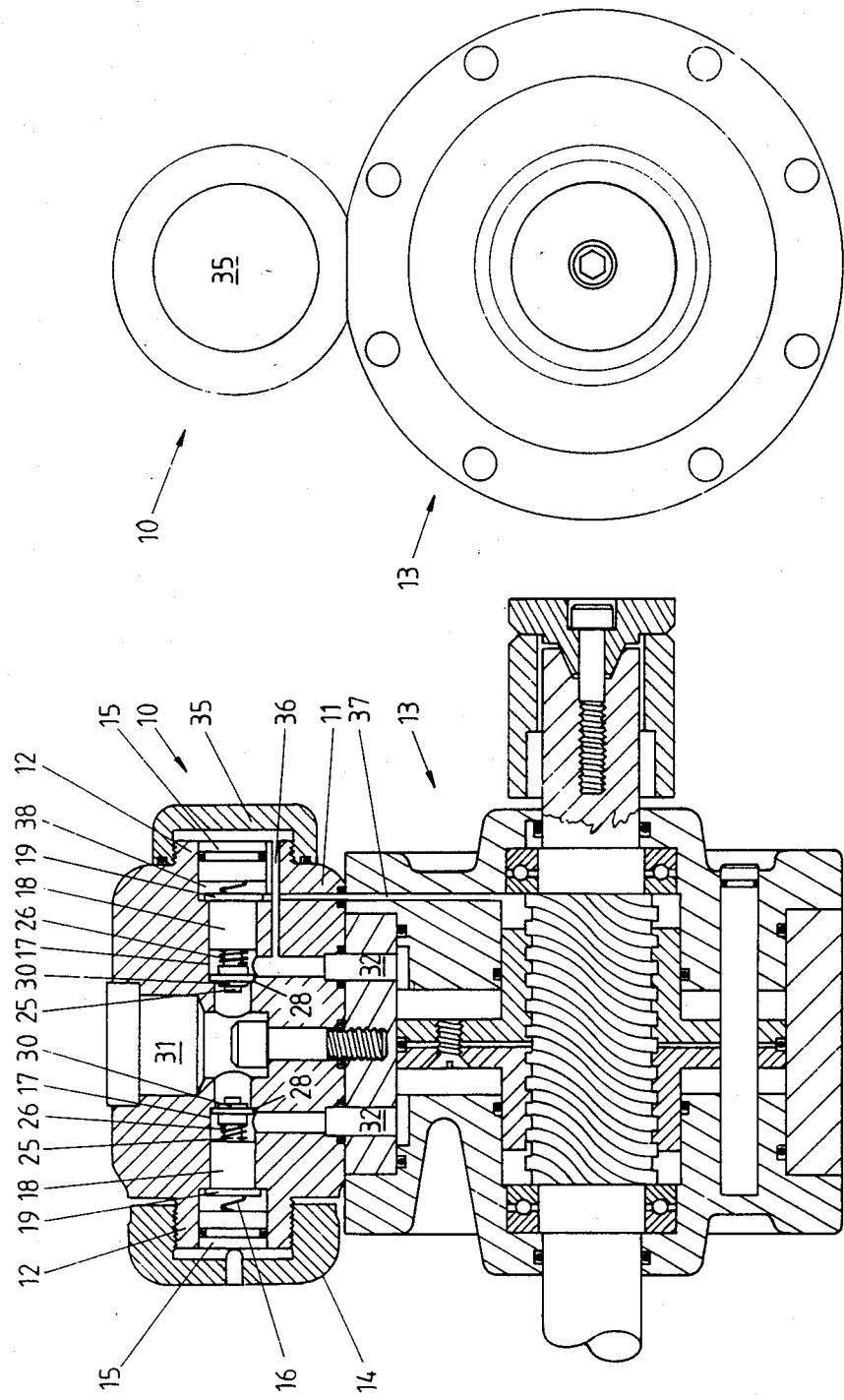
FIG. 1 shows diagrammatically a section through a valve according to this invention.
FIG. 2 is a fragmentary end elevation of FIG. 1.

In this embodiment a two-way valve 10 comprises a body 11 having a pair of end bosses 12 at its ends. The body 11 is bolted to a rotationally actuated piston pump 13 which is the subject of co-pending Australian application PI 3989. Shown at the left hand side, the end boss 12 is threadably engaged by the thread of a central adjusting knob 14 which has a central pin bearing against a spring retainer 15 which bears against the outer end of a respective relatively heavy spring 16.

The body 11 contains two relatively large diameter cylindrical surfaces 17 in each of which is slidable a piston 18 having a flange 19 at its outer end and containing a recess 20 in its outer end for receiving its respective spring 16. The piston 18 in each instance is provided with an inwardly directed spindle 25 surrounded by a relatively light spring 26 which bears against the outer face of a relatively small metering valve member 27 which is freely slidable over the spindle 25 but sealably engages that spindle, and having a valve end 28 which bears against a valve seat 29 within the body 11. A circlip 30 on spindle 25 functions as an abutment member to positively remove the valve end 28 from its seat 29 upon outward movement of piston 18, but valve member 27 functions as a floating valve member to constitute a non-return valve in each instance, the non-return valve being located hydraulically between a reservoir 31 and a respective hydraulic line 32. The outer diameter of valve member 27 is less than that of piston 18 so that pressure of fluid from hydraulic line 32 urges piston 18 against spring 6.

If sufficient pressure is applied to oil on the left hand side hydraulic line 32, that pressure will move the left hand piston 18 against its spring 16, both the pressure and the amount of movement being adjustable by the knob 14 which compresses spring 16. As the piston 18 moves outwardly, the circlip 30 on the end of the spindle 25 draws the valve member 27 away from the valve seat 29, and therefore fluid will flow (with negligible constriction in the flow path) from the left hand hydraulic line 32 to the reservoir 31, while the non-return function of the right hand side valve member 27 will allow replacement of that fluid to the pump.

Figure 4:
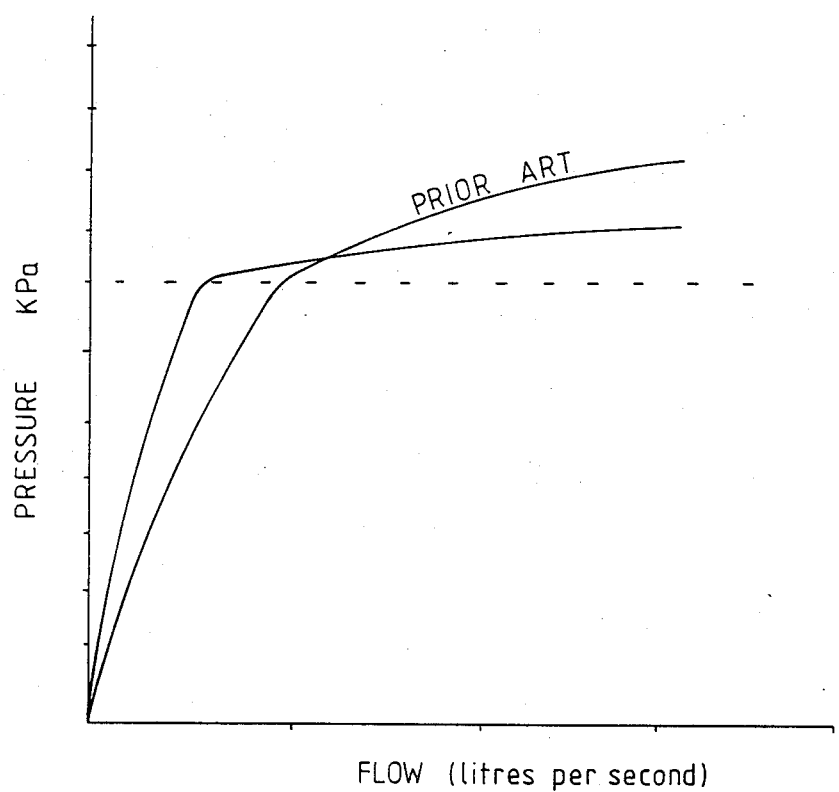
FIG. 4 shows the improved effect obtained with the pressure/flow relationship, wherein a steep increase in pressure can be achieved with only a small increase in flow.

The pressure/flow relationship is shown in FIG. 4.

Figure 3:
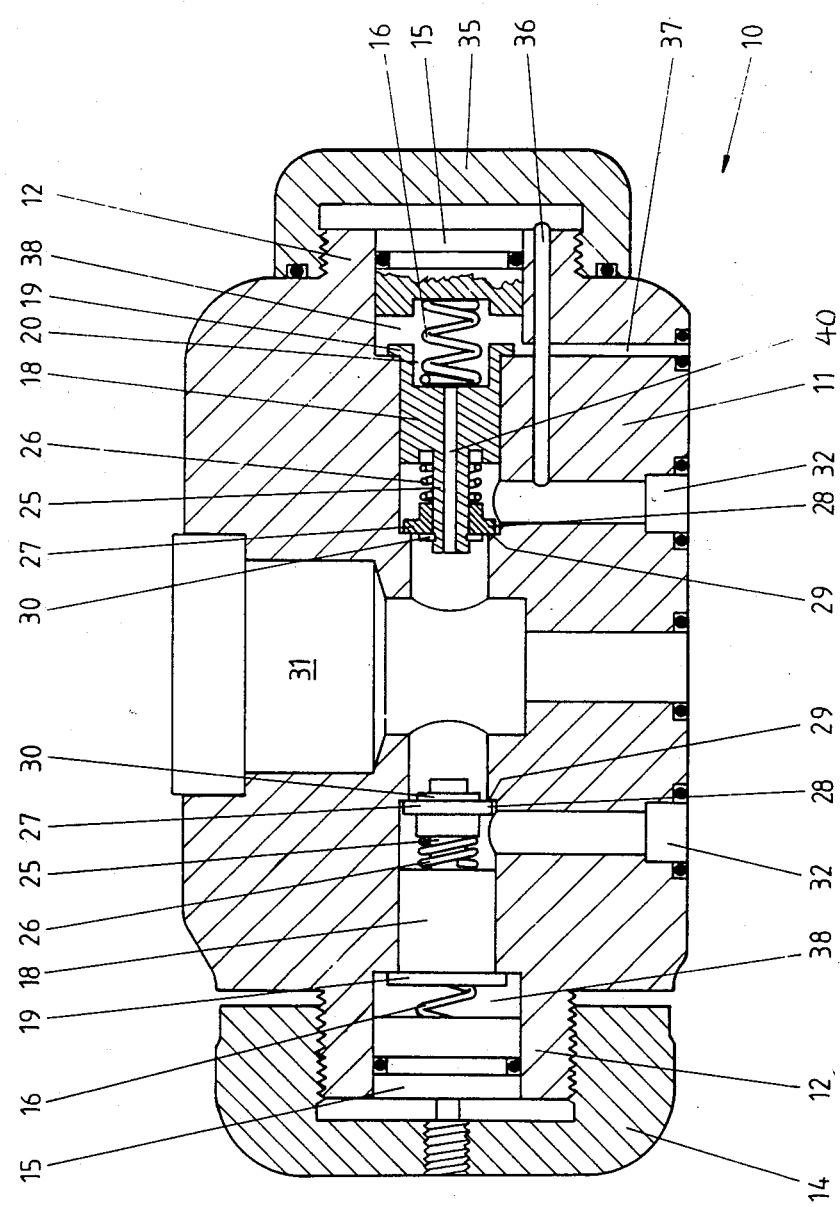
FIG. 3 is an enlarged section of the valve of FIG. 1.

The right hand side valve assembly would, in use, be the same as the left hand side. However, FIGS. 1 and 3 show an alternative arrangement wherein use is made of the almost straight-line relationship between pressure and flow, up to the "knee of the curve" of FIG. 4. When the right hand side arrangement is used, the cap 35 functions solely as a closure cap. However, pressure fluid is introduced through conduit 36 to the outer face of spring retainer 15, the higher the flow rate, the higher the pressure, thus providing an automatic compensation which reduces need for adjustment, for example, that illustrated at the left hand side. This alternative is frequently desirable. With both arrangements, the pressure which is imparted also functions on the non-return valve at the other side lifting the relevant valve member 27 away from its valve seat, so that there is a ready flow of hydraulic fluid to fill any voids created by movement of the hydraulic equipment to which the valve is attached. By this means, the fluid level within the reservoir 24 will fluctuate by only a small amount, thereby enabling the reservoir 24 to be of small capacity.

It will be noted that neither piston 18 nor valve member 27 carries on it any resilient piston ring, small degrees of leakage being tolerable in the arrangement illustrated. Leakage may also occur past the piston rod of pump 13, and this is accommodated by a second leakage conduit 37, leakage being into space 38 between spring retainer 15 and piston 18, this space being in direct communication with reservoir 31, through a further conduit 40 (FIG. 3). The piston and valve member are responsive to small differences in pressure, and consequently there is very small increase in pressure when the piston 18 moves against its spring 16 to open the valve member 27 from its seat. The opening of the valve member functions as a metering device (as in all pressure relief valves), but the pressure/flow curve is much flatter than in prior art valves, as depicted in FIG. 4. This is of considerable importance for gymnasium equipment.

A consideration will indicate the invention to be one of great simplicity which nevertheless results in an effective and inexpensive two-way valve.

What is claimed is:

1. A two-way valve useful for inhibiting fluid flow in one direction while allowing it in a reverse direction, and vice versa, comprising:
   a body having walls defining two cylinders; and
   a pair of valve assemblies, each comprising a piston slidable in a respective cylinder, a spindle extending from one end of the piston, a metering valve member slidable on the spindle normally engaging a valve seat at one end of the relevant cylinder, abutment means on the spindle which engages the valve member and moves it away from the seat upon movement of the piston in one direction, and restraining means inhibiting that movement in that one direction;
   said body comprising a pair of hydraulic lines communicating with respective said cylinders and opening into each of the cylinders between the piston and metering valve member therein, the piston outer diameter exceeding the outer diameter of the valve member so that fluid introduced into a said cylinder at pressure urges the piston to move in said one direction against the restraining means.

2. A two-way valve according to claim 1 wherein said body contains a reservoir, each said metering valve member being located hydraulically between the reservoir and a respective said hydraulic line.

3. A two-way valve according to claim 1 further comprising a respective spring surrounding each said piston spindle and urging the metering valve member thereon towards the relevant valve seat.

4. A two-way valve according to claim 1 wherein each said abutment means comprises a circlip near an end of a said spindle.

5. A two-way valve according to claim 1 further comprising a pair of spring retainers, and said restraining means of each valve assembly comprises a spring co-acting between a said spring retainer and a said piston.

6. A two-way valve according to claim 5 further comprising screw threaded adjustment means threadably engaging the body and so bearing against a spring retainer to vary the position of the spring retainer and in turn vary the force of the spring which co-acts with that spring retainer.

7. A two-way valve according to claim 5 wherein said body comprises a pair of hydraulic lines communicating with respective said cylinders and opening into each of the cylinders between the piston and metering valve member therein, and wherein the body contains a conduit which conducts fluid at pressure from a said hydraulic line to bear against a spring retainer in a direction to compress said spring co-acting between that spring retainer and a piston.

8. A two-way valve according to claim 1 wherein each said abutment means comprises a circlip near an end of a said spindle.

* * * * *